Figure 1:
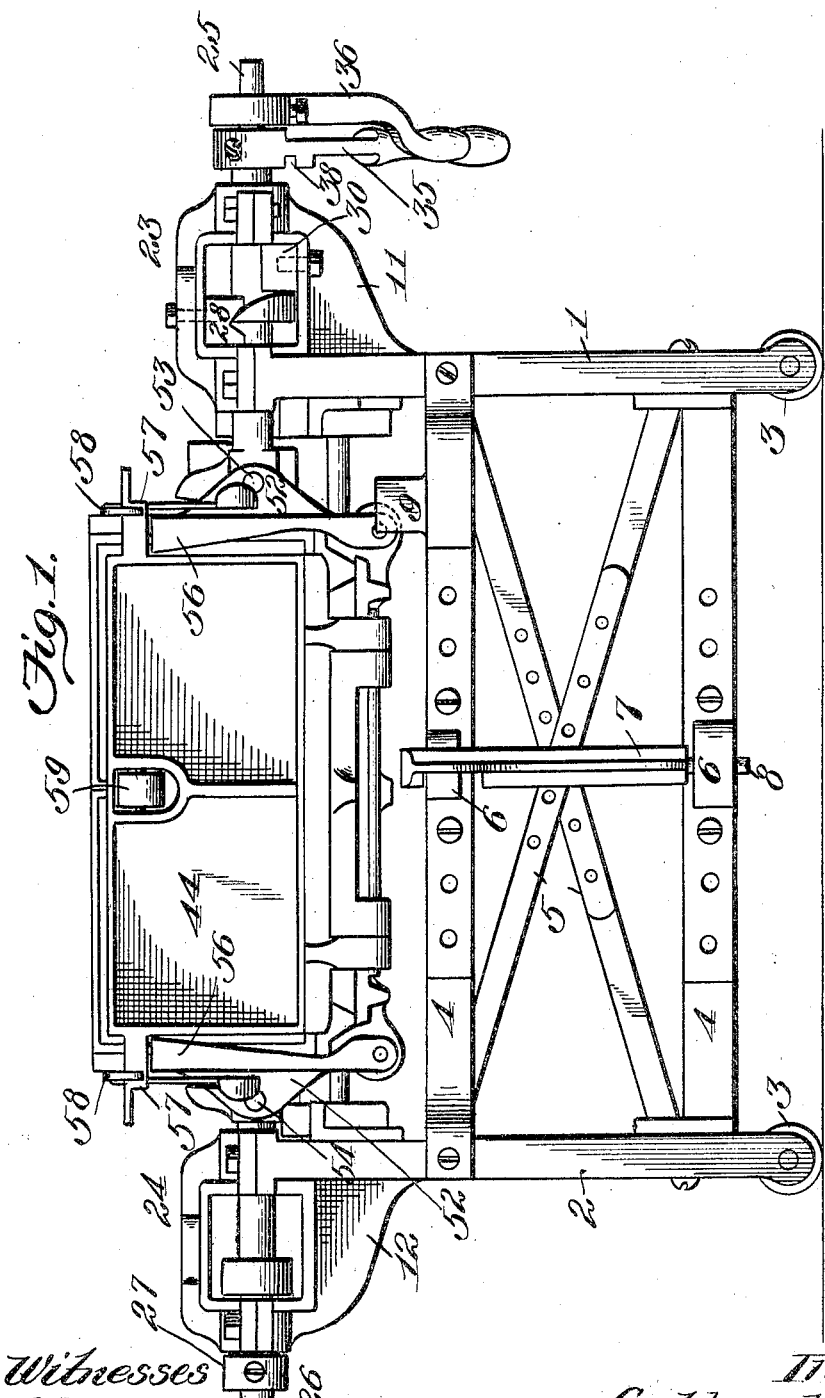

No. 770,586. PATENTED SEPT. 20, 1904.
G. JAEGER.
APPARATUS FOR MAKING TILES.
APPLICATION FILED JUNE 6, 1904.
NO MODEL. 4 SHEETS—SHEET 1.

Witnesses
C. D. Kesler.
James L. Norris, Jr.

Inventor
Gebhard Jaeger
By James L. Norris.
Atty.

No. 770,586. PATENTED SEPT. 20, 1904.
G. JAEGER.
APPARATUS FOR MAKING TILES.
APPLICATION FILED JUNE 6, 1904.
NO MODEL. 4 SHEETS—SHEET 2.

Witnesses
Inventor
Gebhard Jaeger
By James L. Norris.
Atty.

No. 770,586. PATENTED SEPT. 20, 1904.
G. JAEGER.
APPARATUS FOR MAKING TILES.
APPLICATION FILED JUNE 6, 1904.
NO MODEL. 4 SHEETS—SHEET 3.
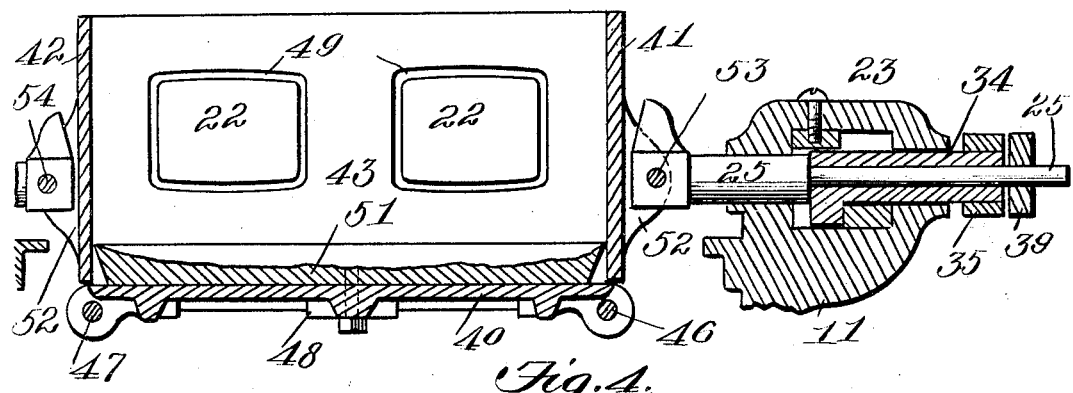
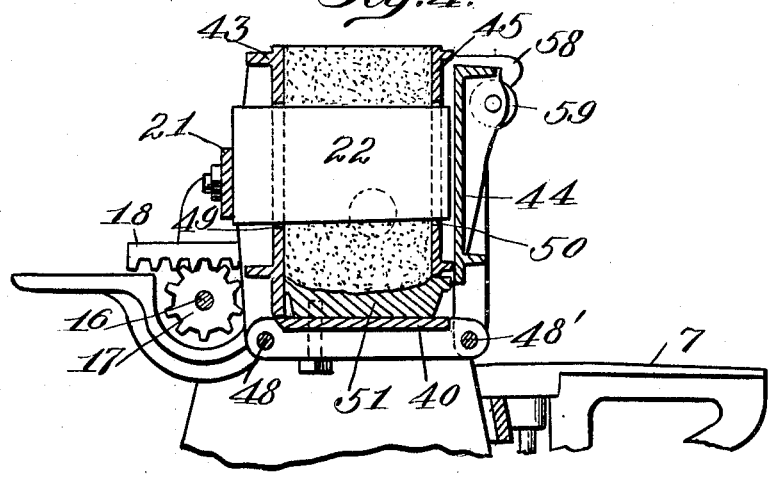
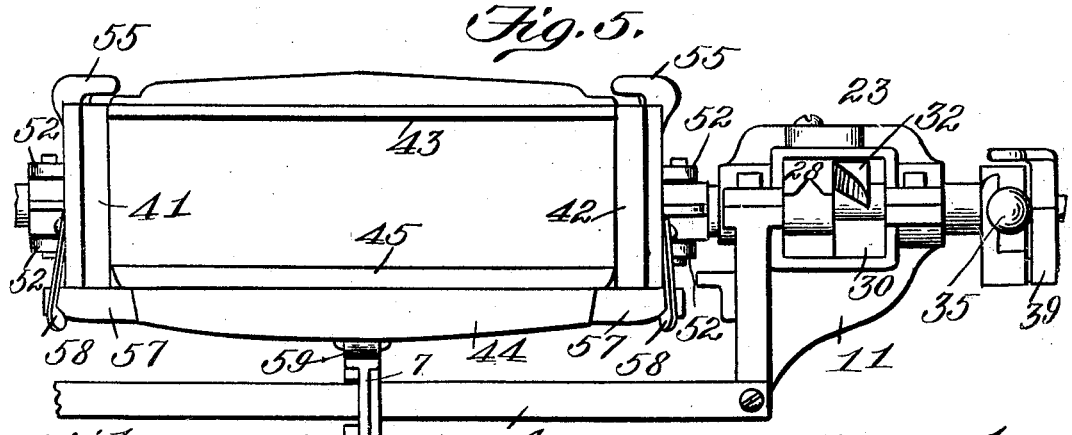
Witnesses:
Inventor
Gebhard Jaeger
By James L. Norris
Atty No. 770,586. PATENTED SEPT. 20, 1904.
G. JAEGER.
APPARATUS FOR MAKING TILES.
APPLICATION FILED JUNE 6, 1904.
NO MODEL. 4 SHEETS—SHEET 4.
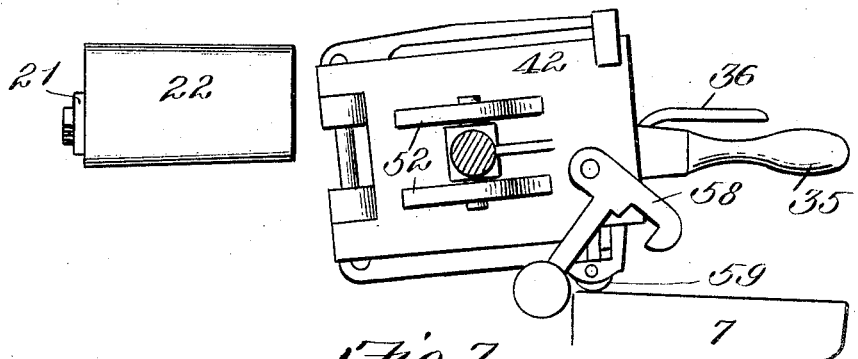
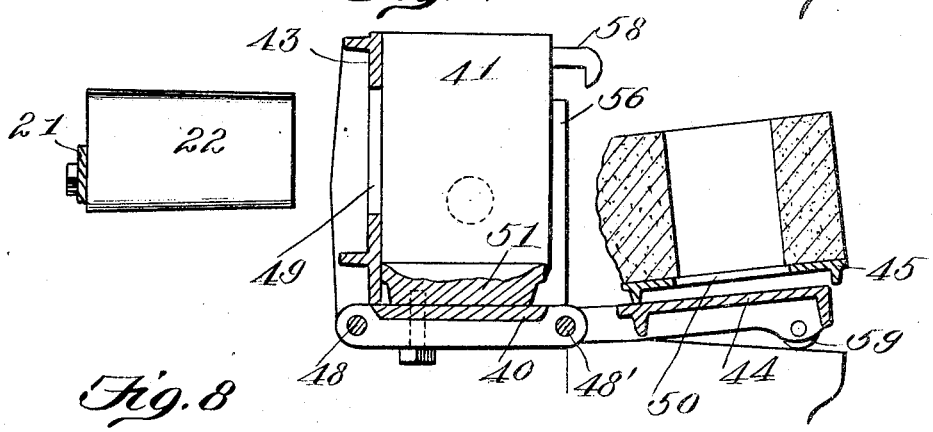
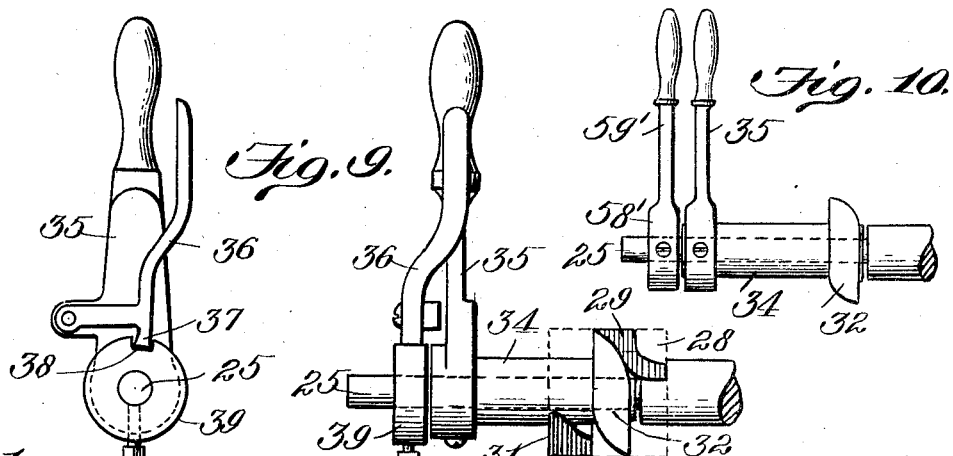
Witnesses:
Inventor
Gebhard Jaeger No. 770,586. Patented September 20, 1904.

UNITED STATES PATENT OFFICE.

GEBHARD JAEGER, OF COLUMBUS, OHIO, ASSIGNOR TO THE HAYDEN AUTOMATIC BLOCK MACHINE COMPANY, OF COLUMBUS, OHIO, A CORPORATION OF OHIO.

APPARATUS FOR MAKING TILES.

SPECIFICATION forming part of Letters Patent No. 770,586, dated September 20, 1904.

Application filed June 6, 1904. Serial No. 211,383. (No model.)

*To all whom it may concern:*

Be it known that I, GEBHARD JAEGER, a citizen of the United States, residing at Columbus, in the county of Franklin and State of Ohio, have invented new and useful Improvements in Apparatus for Making Tiles, of which the following is a specification.

This invention relates to an apparatus for molding hollow or solid tiles, which may be formed of concrete or any other suitable material or a combination of materials, and said apparatus is especially adapted to mold what is known as "concrete blocks," the body of which is formed of concrete; but the material employed in the construction of the block may be of any suitable character.

The invention aims to construct an apparatus for the purpose above set forth provided with means for automatically releasing the mold from the molded tile and for automatically removing the molded tile from the mold.

The invention further aims to construct an apparatus for the purpose set forth which can be adjustable, so as to provide for the molding of tiles of varying lengths and configuration.

The invention further aims to provide an apparatus for molding tiles whereby the parts which constitute said apparatus can be readily assembled and separated as occasion requires.

The invention further aims to construct an apparatus for molding tiles which shall be simple in its construction, adjustable, strong, durable, efficient in its use, and comparatively inexpensive to set up.

With the foregoing and other objects in view the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, and wherein like characters of reference denote corresponding parts throughout the several views, and in which—

Figure 2:
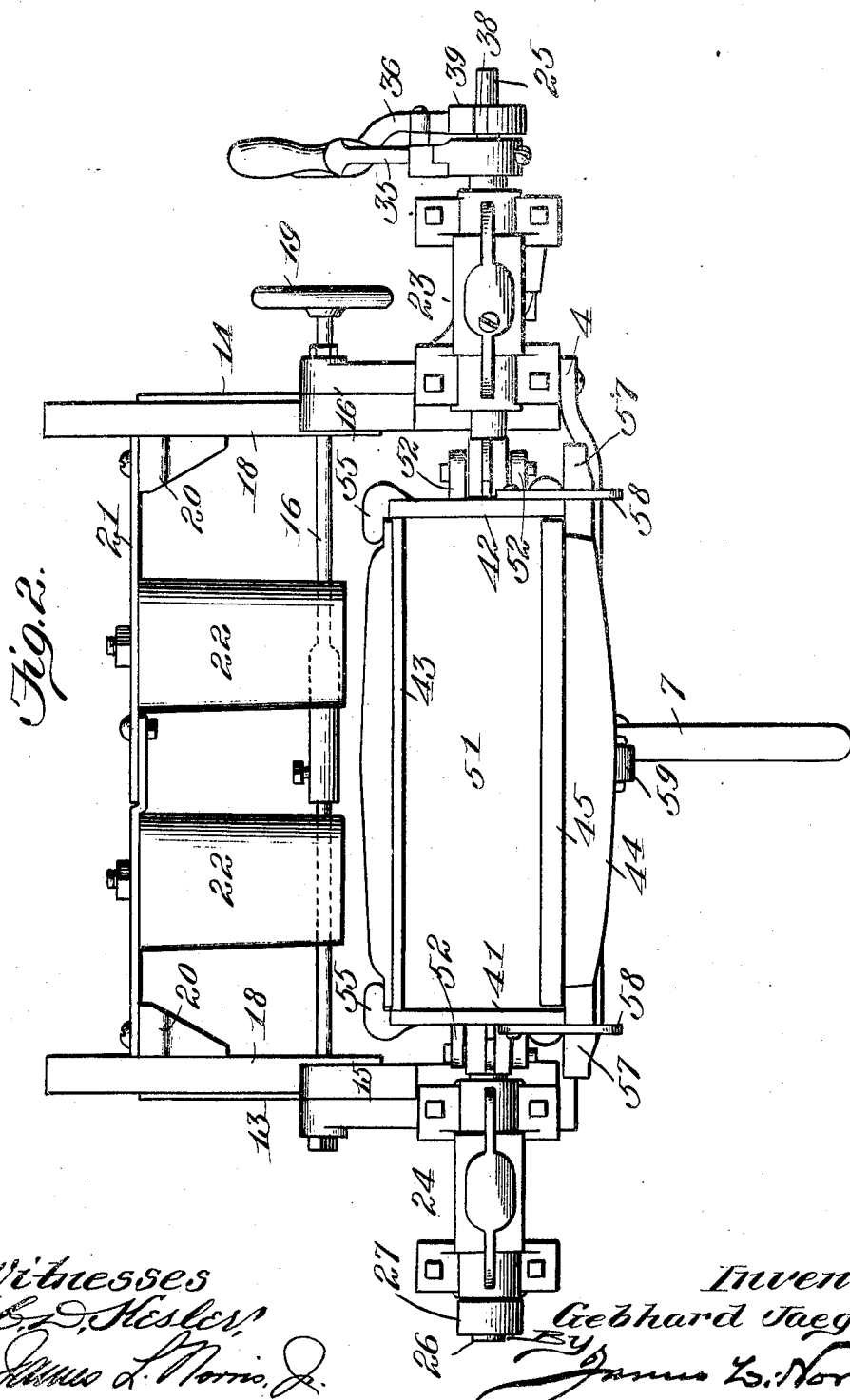

Figure 1 is a front elevation of the machine. Fig. 2 is a top plan view. Fig. 3 is a longitudinal vertical section. Fig. 4 is a vertical transverse section. Fig. 5 is a front view showing the mold tilted and open. Fig. 6 is an end view showing the mold tilted and open. Fig. 7 is a transverse sectional view of the mold with the molded article discharged therefrom. Fig. 8 is an end elevation of the operating handle and lever. Fig. 9 is a side elevation of the rotatable means for the mold, and Fig. 10 is a side elevation of a modified form of rotating means for the mold.

Referring to the drawings by reference characters, 1 and 2 denote a pair of supporting-standards provided at their bottoms with rollers 3 to permit of shifting the apparatus when set up to any point desired. The standards 1 and 2 are connected together through the medium of the lengthwise-adjustable brace-rods 4 and 5, the former being arranged at the front and the latter at the rear of the apparatus. The brace-rods 4 and 5 may be of any suitable construction and formed of as many sections as desired to enable the spacing apart of the standards 1 and 2 any desirable distance for a purpose hereinafter set forth. The front brace-rods 4 are each provided with an apertured offset 6, upon which is mounted a swinging supporting-bracket 7, and said bracket is pivotally connected to the brace-rods 4 through the medium of a vertical pivot-rod 8, which projects through and is suitably connected to the offsets 6. The brace-rods 4, as well as the brace-rods 5, are connected to the standards 1 2 in any suitable manner, and the upper of the brace-rods 4 is provided with a vertically-extending stop-arm 9, the function of which will be hereinafter referred to.

Projecting laterally from the outer face of each of the standards 1 and 2 is a supporting-bracket, the bracket for the standard 1 being indicated by the reference character 11 and the bracket for the standard 2 indicated by the reference character 12. The brackets 11 and 12 may be an integral part of the standards 1 2 or be secured to the standards 1 and 2 by any suitable holdfast devices. Arranged against and secured to the inner face of each of the supporting-standards 1 2 is a rearwardly-extending supporting-bracket. The rearwardly-extending supporting-bracket which is attached to the standard 1 is indicated by the reference character 13, and the rearwardly-extending supporting-bracket which is attached to the standard 2 is indicated by the reference character 14. The brackets 13 14, if desired, may be an integral part of the standards 1 2 instead of separate members. Attached to the inner face of the standard 1 at the rear upper corner thereof is a combined guide and retaining arm 15, and attached to the inner face of the standard 2 at the upper rear corner thereof is a combined guide and retaining arm 16'. The arms 15 16' are arranged a suitable distance above the top of the brackets 13 14, and the function of said arms will be hereinafter referred to.

Arranged at the rear of the machine and journaled in the brackets 1 and 2 is a lengthwise-adjustable and sectional operating-shaft 16, carrying near each end a sprocket-wheel 17. The shaft 16 is lengthwise adjustable, so it can be extended to obtain the necessary length in accordance with the distance apart the supporting-standards are spaced. The brackets 13 and 14 are constructed in such a manner as to permit of the operation of the sprocket-wheels 17, as said wheels 17 are arranged in alinement with said brackets 13 14. Slidable upon and supported by the brackets 13 14 is a pair of horizontally-movable toothed racks 18, which are adapted to be engaged by the sprocket-wheels 17, so that when said wheels 17 are operated in one direction the racks will be moved forwardly and toward the mold of the apparatus, and when said wheels are operated in an opposite direction the racks will be moved rearwardly and away from the mold of the apparatus. The racks are retained and guided upon the brackets 13 14 through the medium of the combined guide and retaining arms 15 16'. The shaft 16, as shown, is operated manually through the medium of a hand-wheel 19; but it is evident that any suitable mechanism can be employed for operating said shaft 16, whether said means be a manual or a mechanical one.

Connected to the racks 18 through the medium of the coupling-arms 20 is a longitudinally-extending sectional supporting-bar 21, which is adjustable lengthwise, so as to increase and decrease the length of said bar in accordance with the length of the shaft 16 and the distance apart of the standards 1 and 2, and said bar 21 has suitably secured thereto a pair of horizontally-reciprocatory plungers 22. As shown, two plungers are employed in the apparatus set up; but it is evident that the number of plungers can be decreased or increased, as occasion requires. The plungers are moved horizontally through the medium of the sprocket-wheels 17 engaging the racks 18, and it will be evident that when the shaft 16 is rotated in one direction the plungers will be moved toward and into the mold to be hereinafter referred to, and when the shaft 16 is operated in an opposite direction the plungers 22 will be moved out of the mold and rearwardly thereof.

The laterally-extending supporting-brackets 11 12 and the top of the standards 1 2, in connection with the retaining members, (designated by the reference characters 23 24,) form bearings for the trunnions 25 26. The retaining member 23 is secured to the laterally-extending bracket 11 through the medium of any suitable holdfast devices, and the retaining member 24 is secured to the laterally-extending bracket 12 through the medium of any suitable holdfast devices. The trunnion 25 is rotatably as well as longitudinally movable, and the manner in which such operation of said trunnion 25 is effected will be hereinafter referred to. The trunnion 26 is rotatable in its bearings and carries on its outer end a retaining-collar 27. The retaining member 23 has secured to its lower face in any suitable manner a depending protuberance 28, having one side provided with a cam-face 29. The laterally-extending bracket 11 has secured to its upper face near its outer end an upwardly-extending protuberance 30, having one side provided with a cam-face 31. The cam-faces 29 and 31 of the protuberances 28 and 30 are adapted to be engaged by a cam 32, carried by a sleeve 34, mounted upon the trunnion 25. The cam 32 has beveled ends, which engage, respectively, with the cam-face 29 of the protuberance 28 and the cam-face 31 of the protuberance 30. By such an arrangement the trunnion 25 is caused to move longitudinally in one direction or the other. If the cam 32 engages the protuberance 28, the trunnion 25 will be caused to move outwardly; but if the cam 32 engages the protuberance 30 the trunnion 25 will be caused to move inwardly. The sleeve 34 is loosely mounted upon the trunnion 25 and provided with an operating-handle 35, carrying a connecting-lever 36, said lever 36 being provided with a protuberance 37, which is adapted to engage in a notch 38, formed in a disk 39, fixed upon the outer end of the trunnion 26, and by such an arrangement when the protuberance 37 engages in the recess 38 the sleeve 34 and trunnion 25 will rotate together when the handle is moved.

The mold in which the tiles are formed consists of a base-plate 40, a pair of end walls 41 42, a rear wall 43, and a front wall comprising a hinged section 44 and a removable section 45. The end wall 41 is pivotally connected to one end of the base-plate 40, as at 46. The end wall 42 is pivotally connected to the other end of the base-plate 40, as at 47. The rear wall 43 is pivotally connected to the rear of the base-plate 40, as at 48, and the section 44 of the front wall is pivotally connected to the front of the base-plate 40, as at 48'. The connection between the walls 41 42 43, section 44, and base-plate 40 is such that said walls and section can be disconnected from the base-plate 40 if it is desired to increase or decrease the size of the mold or to change the contour of the mold for molding blocks of various configuration. The rear wall 43 is provided with a pair of openings 49 to permit the entrance of the plungers 22, and the removable section 45 is provided with a pair of openings 50, corresponding to the openings 49, to permit of the passage of the plungers 22, so that the openings or opening formed by the plungers will extend entirely through the molded tile. The upper face of the base-plate 40 is constructed of any suitable design, so that the proper configuration will be given to the face of the molded tile. In lieu of forming the upper face of the base-plate 40 of the mold with any suitable design a removable auxiliary base-plate 51 can be employed, which is adapted to rest upon and be secured to or form a part of the base-plate 40 and is consttucted of any suitable design, so that the proper configuration will be given to the face of the tile. Each of the end walls 41 42 has projecting in a lateral direction from its outer face a pair of apertured lugs 52, and between the lugs 52 of the end wall 41 is pivotally connected, as at 53, the inner end of the trunnion 25, and between the pair of lugs 52 of the end wall 42 is pivotally connected, as at 54, the inner end of the trunnion 26. Each of the end walls 41 42 is also provided at the upper rear corner thereof with a retaining-flange 55 for the rear wall 43, and at the front side of each of the end walls 41 42 a vertically-extending flange 56 is provided for retaining the removable section 45 of the front wall in position.

The hinged section 44 of the front wall of the mold is provided at each end with a laterally-extending protuberance 57, which projects past the end walls 41 42, and said protuberances 57 are adapted to be engaged when the mold is in an upright position by a pair of gravity return-latches 58, carried by the end walls 41 42. The hinged section 44 of the front wall carries on its outer face a friction-roller 59, which when the mold is moved from vertical to a horizontal position and the front wall of the mold moved forwardly in a manner as hereinafter described the said roller 59 will travel upon the swinging supporting-bracket 7. The gravity-latches 58 are pivoted at their rear ends to the end walls 41 42 and are so arranged that when the mold is moved to a horizontal position the latches will swing clear of the protuberances 57; but when the mold is in a vertical position the latches 58 will engage the protuberances 57 and retain the front wall of the mold in position.

The trunnions 25 26 act as a means for suspending the mold as well as a means for rotating the mold, and the trunnion 25 acts as a means for opening the mold when the latter is rotated upon its axis—the trunnions 25 26. The trunnion 25 when operated in a direction to restore the mold to its inoperative position acts also as a means for causing the discharge of the molded tile from the mold upon the front wall of the mold.

The operation of the apparatus is as follows: It will be assumed that the mold is empty and in its vertical or inoperative position. The material for forming the face portion of the tile is then placed within the mold, the plungers are then moved into the mold through the operation of the shaft 16, the plungers 22 when in such position extend horizontally of the mold and through the openings in the removable section 45 of the front wall, and the operation of the plungers 22 in the manner as just set forth compresses the material which forms the face portion of the tile. After the plungers have been moved to the position mentioned the mold is filled up with concrete or cement and such material is allowed to set. The shaft 16 is then operated in a reverse direction, which causes the removal of the plungers from the mold. The handle 35 is then grasped and the lever 36 connected with the disk 39, and the trunnion 25, through the medium of the handle 35 and lever 36, is then rotated so as to move the mold to a horizontal position. During the movement of the trunnion 25 the cam 32 engages with the protuberance 28 and causes the trunnion 25 to move in a longitudinal direction as it is rotated. Such movement of the trunnion 25 draws the pivoted end walls 41 42 away from the front and rear walls of the mold, thereby opening the mold. When the mold is moved to a horizontal position, the latches 58 swing free of the protuberances 57. By grasping and moving in an opposite direction the handle 35 and lever 36, the latter being in engagement with the disk 39, will rotate the trunnion 25 in an opposite direction, which will cause the mold to assume a vertical position with the exception of the front wall of the mold, which when the trunnion 25 is moved in an opposite direction will be caused to move forwardly, carrying the molded article therewith, or, in other words, the sections 44 and 45 of the front wall of the mold will be moved over the swinging bracket 7. The molded tile is then supported upon the removable section 45 of the front wall, and said tile can then be transported to any place desired. When the trunnion 25 is moved in an opposite direction, or, in other words, is moved so as to bring the mold to a vertical position, the cam 32 will engage the protuberance 31 and cause the trunnion 25 to have a longitudinal movement toward the mold as said trunnion 25 is being rotated. When the mold has been brought back to its inoperative position, the front wall thereof is raised by hand, so it can be engaged by the latches 58 and be connected to the end walls. The removable section 45 of the front wall is then placed in position in the mold. As the trunnion 25 does not have a sufficient longitudinal movement imparted thereto to bring the side walls in close proximity to the front wall of the mold, when the mold is moved to its inoperative or vertical position the handle 35 is grasped and moved rearwardly, causing the sleeve 34 to be rotated rearwardly and independently of the trunnion 25, thereby completely closing the mold. After the mold has been closed the operation of forming another tile is carried on in the same manner as has been set forth.

In the construction shown in Fig. 10 a modified form of rotating means for the mold is set up, which will permit of the rotation of the mold while it remains closed as well as enabling, when occasion requires, the automatic opening of the mold when the latter is rotated. The difference between the structure shown in Fig. 10 over that shown in Fig. 9 is that the connecting-lever 36 and the disk 39 are dispensed with and in lieu thereof a collar 58' is fixed directly to the outer end of the trunnion 25, and said collar 58' carries a handle 59'. Otherwise than that as stated the construction of Fig. 10 is the same as that shown in Fig. 9. By the employment of the handle 59', which is independent of the handle 35, the mold can be rotated independently of the handle 35, so that said mold when rotated by the handle 59' remains closed and after the mold has been shifted by the handle 59' it can be opened by shifting the handle 35, which is evident, owing to the fact that the handle 59' is connected to the rotatable and longitudinally-movable sleeve mounted upon the trunnion 25. When the handles 35 and 59' are simultaneously moved to their normal positions or swung back, the molded article will be discharged upon the front wall of the mold, said front wall being projected forwardly in a manner as hereinbefore referred to. It will also be evident by moving the two handles 35 and 59' simultaneously in one direction when rotating the mold the latter will be automatically opened during its rotation and when said handles are simultaneously moved in an opposite direction the molded article will be discharged in a manner as hereinbefore set forth. The independent handle 59' is provided to enable the rotating of the mold without opening it, as it has been found necessary to provide such arrangement when molding certain kind of tiles.

The various parts of the apparatus are detachably connected together, so that the apparatus can be readily taken apart for transportation and again set up without any inconvenience.

The adjustability of the elements which connect the standards of the apparatus as well as the operating-shaft and the supporting means for the plungers permit of employing various-sized molds, so that any-sized tile can be molded, the walls of the molds being detachably connected together to permit of the removal of the front and rear walls of the mold as well as the base-plate of the mold, so that different-sized front and rear walls and a different-sized base-plate can be employed, which, it is evident, will enable the molding of various-sized tiles. It will also be evident that the plungers can be dispensed with, so that, if desired, a solid tile or one of any suitable configuration can be molded by the apparatus.

It is thought the many advantages of my improved apparatus for molding hollow or solid tiles can be readily understood from the foregoing description, taken in connection with the accompanying drawings, and it will furthermore be evident that changes, variations, and modifications can be resorted to without departing from the spirit of my invention or sacrificing any of its advantages, and I therefore do not wish to restrict myself to the details of construction hereinbefore described, and set forth in the annexed drawings, but reserve the right to make such changes, variations, and modifications as come properly within the scope of the protection prayed.

Having thus fully described my invention, what I claim as new, and desire to secure by Letters Patent, is—

1. An apparatus for molding tiles comprising a mold suspended for rotation, and means for automatically opening the mold and discharging the molded tile therefrom during the rotation of the mold.

2. An apparatus for molding tiles comprising a mold suspended for rotation, and a rotatable suspension means connected with the mold and adapted when operated to automatically open the mold and cause the discharge of the molded tile during the rotation of the mold.

3. An apparatus for molding tiles comprising a mold suspended for rotation, a rotatable suspension means connected with the mold and adapted when operated to automatically open the mold and cause the discharging of the molded tile during the rotation of the mold, and an adjustable supporting means for said suspension means.

4. An apparatus for molding tiles comprising a sectional mold suspended for rotation and provided with an automatically-releasable front wall adapted to support the molded tile, and means for automatically opening the mold and for projecting forwardly said front wall to discharge the tile from the mold during the rotation of the mold.

5. An apparatus for molding tiles comprising a sectional mold suspended for rotation and provided with an automatically-releasable front wall adapted to support the molded tile, and a rotatable suspension means connected with the mold and adapted when operated to automatically open the mold and project forwardly said front wall to discharge the tile from the mold during the rotation of the mold.

6. An apparatus for molding tiles comprising a sectional mold suspended for rotation and provided with an automatically-releasable front wall adapted to support the molded tile, a rotatable suspension means connected with the mold and adapted when operated to automatically open the mold and project forwardly said front wall to discharge the tile from the mold during the rotation of the mold, and an adjustable supporting means for said suspension means.

7. An apparatus for molding tiles comprising a mold suspended for rotation, and a rotatable suspension means for said mold adapted to automatically open the mold when rotated in one direction and to automatically discharge the molded tile and close the mold when rotated in an opposite direction.

8. An apparatus for molding tiles comprising a mold suspended for rotation, a rotatable suspension means for said mold adapted to automatically open the mold when rotated in one direction and to automatically discharge the molded tile and close the mold when rotated in an opposite direction, and an adjustable supporting means for said suspension means.

9. An apparatus for molding tiles having a rotatable mold consisting of a rear wall provided with an opening, a front wall formed of an imperforate and a removable perforated section, a pair of end walls, a base-plate, and means for detachably and pivotally connecting said end and side walls and said imperforate section of the front wall to said base-plate.

10. An apparatus for molding tiles having a rotatable mold consisting of a rear wall provided with an opening, a front wall formed of an imperforate and a removable perforated section, a pair of end walls, a base-plate, means for detachably and pivotally connecting said end and side walls and said imperforate section of the front wall of said base-plate, means carried by the end walls for retaining the rear wall in its operative position, and an automatically-releasable means carried by the end walls for retaining the front wall in its operative position.

11. An apparatus for molding tiles comprising a mold suspended for rotation, means for automatically opening the mold and discharging the molded tile therefrom during the rotation of the mold, a plunger adapted to be moved into and out of said mold, and an adjustable operating means for said plunger.

12. An apparatus for molding tiles comprising a mold suspended for rotation, a plunger adapted to be moved into and out of said mold, an adjustable operating means for said plunger, and rotatable suspension means for said mold adapted to automatically open the mold when rotated in one direction and to automatically discharge the molded tile and close the mold when rotated in an opposite direction.

13. An apparatus for molding tiles comprising a mold suspended for rotation, a plunger adapted to be moved into and out of said mold, an adjustable operating means for said plunger, a rotatable suspension means for said mold adapted when operated to automatically open the mold and discharge the molded tile therefrom during the rotation of the mold, and an adjustable supporting means for said operating means and said suspension means.

14. An apparatus for molding tiles comprising a mold suspended for rotation, a plurality of plungers adapted to be moved into and out of said mold, an adjustable operating means for said plunger, a rotatable suspension means for said mold adapted when operated to automatically open the mold and discharge the molded tile therefrom during the rotation of the mold, and an adjustable supporting means for said operating means and for said suspension means.

15. An apparatus for molding tiles comprising a mold suspended for rotation and provided with an automatically-releasable front wall adapted to support the molded tiles, means for automatically opening the mold and for projecting forwardly the said front wall to discharge the tile from the mold during the rotation of the mold, and means for supporting said front wall when it is projected forwardly.

16. An apparatus for molding tiles comprising a mold suspended for rotation and provided with an automatically-releasable front wall adapted to support the molded tile, a rotatable suspension means for said mold adapted when operated to automatically open the mold and project forward said front wall to discharge the tile from the mold during the rotation of the mold, an adjustable supporting means for said suspension means, and means for supporting the front wall when the same is projected forwardly.

17. An apparatus for molding the tiles comprising a mold suspended for rotation and provided with an automatically-releasable front wall adapted to support the molded tile, a rotatable suspension means for said mold adapted when operated to automatically open the mold and project forwardly said front wall to discharge the tile from the mold during the rotation of the mold, means for forming an opening in the tile and adapted to be moved into and out of said mold, an adjustable operating means for said means for forming the opening in the tile, an adjustable supporting means for said operating means and said suspension means, and means for supporting the front wall of the mold when it is projected forwardly.

18. An apparatus for molding tiles comprising a mold suspended for rotation, a pair of rotatable trunnions connected with the mold and adapted to suspend the mold, and means for imparting a longitudinal movement to one of said trunnions when rotated in both directions, causing thereby the opening and closing of the mold and the discharging of the molded tile therefrom.

19. An apparatus for molding tiles comprising a mold suspended for rotation, a pair of rotatable trunnions connected with the mold and adapted to suspend the mold, means for imparting a longitudinal movement to one of said trunnions when rotated in both directions, causing thereby the opening and closing of the mold and the discharging of the molded tile therefrom, and an adjustable supporting means for said trunnions.

20. An apparatus for molding tiles comprising a mold suspended for rotation, a pair of rotatable trunnions connected with the mold and adapted to suspend the mold, means for imparting a longitudinal movement to one of said trunnions when rotated in both directions, causing thereby the opening and closing of the mold and the discharging of the molded tile therefrom, plungers adapted to be moved into and out of said mold, an adjustable operating means for said plungers, and an adjustable supporting means for said operating means and said trunnions.

21. An apparatus of the character described comprising a mold suspended for rotation and comprising a plurality of hinged sections, the front section of which is provided with a roller, and weighted latches carried by the end sections and adapted to release the front section when the mold is rotated.

22. An apparatus of the character described, comprising a rotatable mold, a pair of rotatable trunnions for suspending said mold, a rotatable and longitudinally-movable sleeve for opening the mold mounted upon one of the trunnions, a handle connected to one of the trunnions for rotating the mold, and a handle connected to said sleeve for rotating it, said handles when moved in one direction adapted to automatically discharge the molded article from the mold.

In testimony whereof I have hereunto set my hand in presence of two subscribing witnesses.

GEBHARD JAEGER.

Witnesses:
JAMES L. NORRIS, Jr.,
N. L. BOGAN.